Nov. 6, 1956     G. W. CHENEY ET AL     2,769,206
METHOD FOR PACKAGING FLUIDS, JELLIES, PASTES
AND FLUENT POWDERS

Filed Oct. 9, 1952     2 Sheets-Sheet 1

---

Extrude & supercool tubing of normally crystalline vinylidene chloride polymer with diameter about 0.2 to 0.4 times and wall thickness about 2.5 to 5 times those desired in final tube

↓

Cut supercooled tube to length, about 0.2 to 0.4 times that of desired final tube

↓

Press one end of supercooled tube to seal it shut     ---     *If desired print identifying data on the tube while supercooled*

↓

Maintain tube in supercooled condition, e.g., by refrigeration, until ready to fill and expand it

↓

Place supercooled tube in mold of desired diameter and length of the final tube, such that longitudinal and radial limits of expansion are nearly the same, and clamp open end of tube against longitudinal slippage

↓

Insert filling spout in open end of supercooled tube and inject fluid such as pastes, ointments, creams, solutions, or fine powders, into tube under 5 to 10 pounds pressure, until filled tube is expanded and has become crystalline and oriented

↓

Cap or seal the open, discharge end of the resulting filled, tough collapsible tube

*Fig. 1*

INVENTORS.
Grant W. Cheney
BY Arnold L. Stark

*Griswold & Burdick*
ATTORNEYS

Nov. 6, 1956    G. W. CHENEY ET AL    2,769,206
METHOD FOR PACKAGING FLUIDS, JELLIES, PASTES
AND FLUENT POWDERS
Filed Oct. 9, 1952                                   2 Sheets-Sheet 2

INVENTORS
Grant W. Cheney
BY Arnold L. Stark

Griswold & Burdick
ATTORNEYS

United States Patent Office 2,769,206
Patented Nov. 6, 1956

2,769,206

METHOD FOR PACKAGING FLUIDS, JELLIES, PASTES AND FLUENT POWDERS

Grant W. Cheney and Arnold L. Stark, Midland, Mich., assignors to The Dow Chemical Company, Midland, Mich., a corporation of Delaware Application October 9, 1952, Serial No. 313,908

1 Claim. (Cl. 18—56)

This invention relates to an improved method and means for packaging fluent materials such as gases, liquids, pastes, ointments, jellies, greases, fine powders, and other industrial, pharmaceutical and food products.

Figure 2:
Figure 3:
Figure 4:
Figure 5:
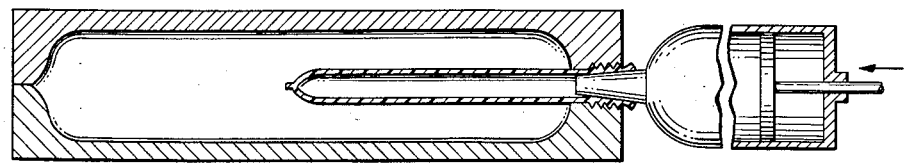
Figure 6:
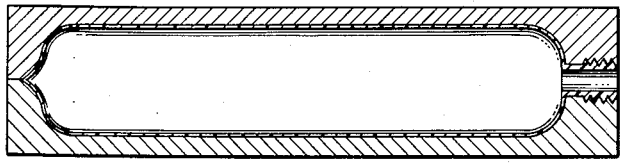
Figure 7:

The invention is illustrated in the annexed drawings wherein:

Fig. 1 is a descriptive flow sheet of the process;
Fig. 2 is a longitudinal view and
Fig. 3 is an end view of the supercooled tube used in the process;
Fig. 4 is a longitudinal view of the same tube with one end sealed;
Fig. 5 illustrates the tube of Fig. 4 in position to be filled, in an appropriate mold;
Fig. 6 illustrates the filled tube, still in the mold; and,
Fig. 7 shows the filled and capped tube as an article of commerce.

The method of the invention comprises providing a supercooled tube of a normally crystalline vinylidene chloride polymer, sealed at one end, and having a wall thickness from 2.5 to 5 times that desired in the final package and a length from 0.2 to 0.4 times the desired length of the final package. Such a tube is placed in a mold the cavity of which has from 2.5 to 5 times the length and diameter of the supercooled tube and which has means for holding the open end of the tube against significant radial expansion and against longitudinal slippage. A filling spout, appropriate to the material to be packaged, but generally of a long tapered conical shape, is forced into the so-secured open end of the supercooled tube, and the material to be packaged is forced into the tube under a positive pressure which ordinarily needs not exceed 5 to 10 pounds per square inch, gage. The so-introduced fluent material causes the initially small tube to expand both radially and longitudinally to fill the mold or until the distention brings the supercooled material to a crystalline and fully stretched condition. The filled tube may be sealed in any desired manner, either by pinching the unstretched and still supercooled end through which it was filled, or by inserting a plug in that end, or by fitting a friction cap or a screw cap to that end, as may be appropriate. It is convenient to have threads in the clamping shoulder of the mold so that the conical filling spout expands the open end of the tube slightly and into conformity with the threads and a screw cap can be applied to the package.

It is known that polyvinylidene chloride and many copolymers in which vinylidene chloride predominates are normally crystalline materials; that such polymeric bodies become non-crystalline when fused; that they can be extruded to form tubes or other articles when fused; that the extruded products can be chilled rapidly to yield apparently solid products which are non-crystalline and are referred to as being supercooled; that the supercooled condition is transitory but may be prolonged by maintenance of the product at a low temperature (below room temperature and preferably below 0° C. if the condition is to be of great duration); and, that upon mechanical distention a supercooled form of these polymeric bodies is converted to a crystalline form with the crystallites oriented in the direction or directions of the applied distending force. When films are made from such normally crystalline polymers and the orienting forces are applied both longitudinally and transversely, the films are tough and, from their known properties, are impervious to the transpiration of most gases and to the passage of liquids.

The supercooled blanks, used in the present invention, are cut from extruded and supercooled tube whose walls are thick enough to permit the tube to retain its shape. Generally, it is convenient to have a wall thickness of 15 to 40 mils. One end of each supercooled blank is pinched or pressed shut and, due to the character of the supercooled material, this end is effectively welded by such operation. The supercooled blanks may have any desired information, warnings, directions for use of the intended contents, or similar data printed thereon in letters about 0.2 to 0.4 times the size of those desired. The supercooled polymers are receptive to inks and dyes. When the tube is distended, the indicia attain a larger size and can be seen clearly. If desired, a large supply of the supercooled blanks can be kept refrigerated for prolonged periods until needed.

The distention and accompanying orientation are effected, according to the invention, by the material to be packaged. This is much simpler and results in a package with fewer voids than when it is attempted to fill an already stretched and oriented package. The resulting tough, oriented collapsible tube, having wall thicknesses from 3 to 10 mils, is far easier to empty at controlled rates than are the conventional metal foil tubes and give a continuous view of the contents. For products which may require warming before use, the new packages are ideal, since they may be immersed in warm water until the contents are heated without danger of any leakage into or out of the tube.

The new method offers significant advantages over prior practices in packaging pureed, strained or homogenized baby foods. It is no longer necessary to be concerned about surface dehydration of the contents of partly emptied containers. It is unnecessary to remove more food from the container than the child will eat, and there is no danger of contaminating the unused part of the contents with unclean spoons. Instead, the contents can be warmed in the tube and a little may be squeezed into a spoon. When this has been eaten, the spoon can be refilled as often as necessary. When the desired amount has been fed, the tube may be recapped and the unused contents have never been exposed to contamination.

The method may be employed in packaging all types of fluids, including free-flowing powders, and is especially practical with non-gaseous fluids such as liquids, jellies, salves and ointments, lotions, creams, greases, pastes, syrups, sauces, glues and other adhesives, pigments-in-oil, lubricants, putty, calking compounds, aerosol dispersions, or any of numerous other materials which may be used to advantage in controlled small amounts.

In a specific example, a copolymer of about 90 percent vinylidene chloride and 10 percent vinyl chloride, plasticized with about 8 percent of its weight of a mixture of ethyl phthalyl ethyl glycolate and tertiary butyl salicylate, is extruded at 175° C. through a tubing die having an outside diameter of 0.25 inch and a clearance of 0.025 inch between the die and its core. The resulting hot tube is quenched in water at 10° C. and is cut to lengths of 2.25 inches. The tubular pieces now have the appearance of that shown in Figs. 2 and 3. One end of each piece is pressed shut and, due to its supercooled condition, this end becomes sealed. The piece now resembles that of Fig. 4. If desired, the piece has suitable labelling applied by printing with an ink having an organic vehicle. The supercooled condition is maintained by refrigeration, or the tube may be used at once. When it is to be distended and filled, which must be before significant autocrystallization occurs, the tube is clamped in a split mold with about 0.25 to 0.5 inch of the open end of the tube in the mold gate. The cavity of the mold is 0.75 inch in diameter and, exclusive of the neck-clamping gate, is 5.25 inches long. The gate of the mold is threaded. A tapered filling spout is forced into the open end of the supercooled tube (Fig. 5), expanding it slightly into conformity with the threaded gate, and tooth paste is forced through the spout into the tube under sufficient pressure to cause the tube to expand. The filling device is illustrated in Fig. 5 as an injection cylinder. The pressure required in this instance is about 8 pounds per square inch. The tube expands into conformity with the mold, and the degree of longitudinal expansion of the 1.75 inches of original tube within the mold is essentially the same as the degree of radial expansion. The filling spout is removed; the neck of the tube is trimmed, if necessary (Fig. 6); the mold is opened and the packed tube is capped (Fig. 7). The tube has a wall thickness of about 4 mils and a capacity of 2.27 cubic inches, 1.25 fluid ounces or 37 cubic centimeters. It is tough and flexible, and the contents are easily visible. Tubes of other sizes and having other wall thicknesses can be made and filled in like manner.

When, as in the foregoing example, the neck of the tube is to be threaded, it is helpful to warm at least the gate portion of the mold, not to cause plastic flow but, to the contrary, to hasten crystallization of the polymer in that portion which will not become crystallized by the stretching operation. Temperatures near 50° to 75° C. are adequate to cause rapid crystallization.

We claim:

The method which comprises supplying a tube having a wall thickness of from 15 to 40 mils, open at one end and sealed at the other, composed of a normally crystalline vinylidene chloride copolymer in the supercooled condition, placing said tube in a mold whose cavity has the shape of a collapsible dispensing tube and is of from 2.5 to 5 times the length and diameter of the supercooled tube, said mold being gated in one end at a point corresponding to the neck of a collapsible tube; securing the open end of the tube against longitudinal slippage in the gate of the mold, said gate being threaded to imprint threads on the neck of the tube; and applying fluid pressure through the open end of the tube sufficient to distend the tube longitudinally and radially into conformity with the mold and to effect orientation and crystallization of the polymer constituting the body of the so-distended collapsible tube, while warming the mold near the gate area to crystallize the copolymer confined therein.

References Cited in the file of this patent

UNITED STATES PATENTS

| | | |
|---|---|---|
| 1,970,396 | Scherer | Aug. 14, 1934 |
| 2,158,837 | Schukraft | May 16, 1939 |
| 2,199,425 | Waring | May 7, 1940 |
| 2,260,064 | Stokes | Oct. 21, 1941 |
| 2,307,817 | Austin | Jan. 12, 1943 |
| 2,340,834 | Hanson | Feb. 1, 1944 |
| 2,410,936 | Gronemeyer | Nov. 12, 1946 |